United States Patent [19]

Schwartz

[11] 4,217,613
[45] Aug. 12, 1980

[54] MAGNETIC TRANSDUCER HEAD CORE

[75] Inventor: Herbert M. Schwartz, Cherry Hill, N.J.

[73] Assignee: RCA Corporation, New York, N.Y.

[21] Appl. No.: 958,017

[22] Filed: Nov. 6, 1978

[51] Int. Cl.² .................. G11B 5/25; G11B 5/12; G11B 5/42

[52] U.S. Cl. .................. 360/119; 360/125; 29/603

[58] Field of Search ............ 360/119, 120, 125, 127; 29/603

[56] References Cited

U.S. PATENT DOCUMENTS

| | | | |
|---|---|---|---|
| 3,412,217 | 11/1968 | Bygdnes | 360/119 |
| 3,502,821 | 3/1970 | Dvinker | 360/119 |
| 3,577,634 | 5/1971 | Secrist | 29/603 |
| 3,661,570 | 5/1972 | Moss | 360/125 |
| 3,982,318 | 9/1976 | Hennenfent et al. | 360/119 |

Primary Examiner—Robert S. Tupper
Attorney, Agent, or Firm—Samuel Cohen; William Squire

[57] ABSTRACT

A magnetic transducer head core includes two elements bonded with a non-magnetic medium sandwiched between facing surfaces of the elements. An opening for a flux inducing winding is formed in the facing surface of one of the elements adjacent the transducing surface. The opening forms an edge at a first flux gap face. A recess is formed in the facing surface of the other element adjacent the transducing surface and has an edge forming a second flux gap face of shallower depth from the transducing surface than the first face. The recess is filled with non-magnetic material; for example, copper in the case of a metal transducer head core to provide structural support for the shallower face. The pole face depth between the recess edge and transducing surface on the shallower flux gap face is then subsequently formed to a precise dimension after the elements are bonded together.

11 Claims, 8 Drawing Figures

MAGNETIC TRANSDUCER HEAD CORE

The Government has rights in this invention pursuant to a government contract.

The present invention relates to magnetic transducing head cores.

Magnetic recording heads employ a magnetic core, which may be of "U" shape, the legs of the U forming the pole pieces. A flux inducing winding may be coupled to one of the legs for creating a magnetic flux in the core. The space between the pole pieces, known as the "pole piece separation," acts as a flux gap to the flux flowing around the U within the core. This gap is located between two facing surfaces at the end positions of the two pole pieces, respectively, and these surfaces are known as the pole faces. In some forms of heads, at least one of the pole pieces includes a cantilevered element which extends from the end portion of a leg toward the other leg. The pole face of this one leg is at the end of the cantilevered element and it faces the pole face on the other leg. The pole face depth (PFD) is the length of the pole face surface measured from the transducing surface of the head, the transducing surface lying adjacent to the ends of the U.

Data may be transferred from a magnetic head to a magnetic medium such as magnetic tape, by passing the medium along the transducing surface while changing the amount of flux in the gap in response to a signal applied to the flux inducing winding. The medium may be read by employing the head to sense changes in magnetic field intensities produced by the medium as it passes adjacent to the gap.

In a densely recorded medium, there may be as many as thirty or forty thousand flux reversals per inch. The pole face depth (PFD) for such densities becomes important when the recorded track width is less than 0.01 inches. To operate at densities this high, the pole face depth (PFD) should be around 200 to 500 microinches with a flux gap of about 10–16 microinches. Such structure can be realized by employing a cantilevered element such as the described above pole member which is extremely thin.

During the use of the transducing head, the recording medium such as the magnetic tape contacts the cantilevered element. The resulting contact pressure on the pole member is in a direction normal to the cantilevered direction and tends to fracture the pole member. This tendency is high when the recording head material is a relatively brittle material such as a ferrite or an aluminum-silicon-iron alloy known as Sendust which in one form is referred to as Alfecon.

According to one embodiment of the invention one element of a magnetic transducing core is formed with a flux gap member having a flux gap surface thereon and a groove in the flux gap surface. The groove forms a cantilevered pole face member in the core. The groove is filled with a non-magnetic material which is then formed with the flux gap surface into a continuous coplanar surface. The filled groove provides structural support for the pole face member.

Figure 1:
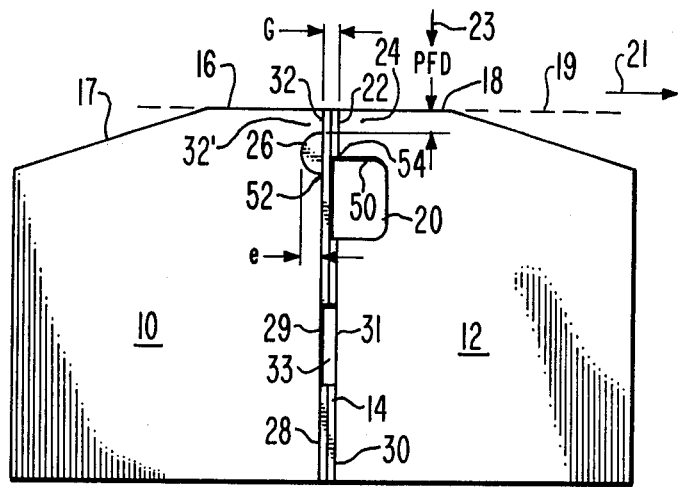
FIG. 1 is an end view of a transducing core embodying the present invention.

In FIG. 1 the magnetic transducing core includes two magnetic elements 10 and 12. The elements 10 and 12 are made from any suitable magnetic material which may be a metal, preferably an aluminum-silicon-iron composition (Alfecon) or a ferrite material. Non-magnetic spacing material 14 is preferably made of aluminum oxide for elements such as Alfecon and ferrites.

In the present example, the core will be described as being made of Alfecon and the spacing material of aluminum oxide for purposes of illustration. The aluminum oxide, which may be deposited by sputtering, spaces the elements 10 and 12 to form a flux gap G between the elements. After deposition of material 14 on the facing surfaces 28 and 30 of the elements excluding respective bonding areas 29 and 31 along the surfaces 28 and 30, which are masked from material 14, the elements 10 and 12 are bonded to each other with a high temperature brazing alloy 33 which may have a relatively high firing temperature, for example, 1600° F. Epoxy materials cannot be used to form the flux gap G as they would be damaged or destroyed by such high temperatures. The bonding technique is conventional. Surface 16 on element 10 and surface 18 on element 12 and the gap material 14 between these surfaces are ground and lapped until they form a continuous transducing surface. This surface is the surface over which the magnetic medium, such as magnetic tape 19 (dashed—FIG. 1), travels in direction 21 during recording and playback operations.

Figure 3:
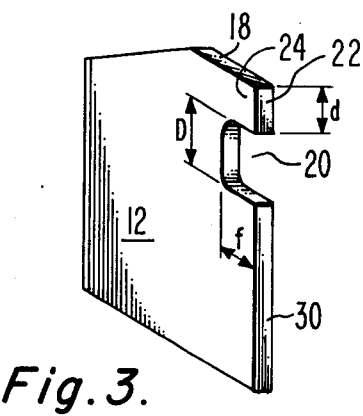
FIG. 3 is a perspective view of the other element of FIG. 1.

The element 12 has a notch or opening 20 in flux face surface 30, FIG. 3, for receiving a flux inducing winding. A pole piece having a face 22 is defined between one edge of 20 and the surface 18. This pole face has a dimension d between surface 18 and one edge of opening 20, FIG. 3 (d being referred to as a "depth" in this art). The opening 20 has a length f and width D. The dimensions D, f and d each may be in the order of several mils. For example, the D and f dimensions may be about 6 mils while d may be about 2 mils. Use of the pole face 22 as a flux gap determining element is not practical because the length dimension f is too large. It has to be large because opening 20 must be large enough to accept a winding. As f is large, if d were made as small as needed for high density recording, the cantilever would be relatively long and of relatively small cross section and therefore much too fragile to be practical. For example, for such an implementation depth d would be approximately 200 microinches as compared to the length f of about 6 mils. The member 24 in this case would tend to fracture due to a force in direction 23 induced by tape 19.

Notch or recess 26 is formed in the pole face surface 28 of the element 10 facing the plane of pole face surface 30 of element 12. A pole face 32 is defined between an edge of the recess 26 and surface 16, this pole face having a pole face depth (PFD) much smaller than the depth d of the pole face formed in element 12. Depth d of element 12 is made sufficiently large to provide structural support to pole member of element 12. The proportions in the drawing are exaggerated for purposes of illustration. Recess 26 is generally semi-cylindrical or rounded in shape and has a length dimension e which may be about 10 times the value of PFD. A more rectangular shape would result in stress concentration at the corners and lead to early failure. The width g of the recess 26 may be about 5 times the length e.

The value of the pole face depth (PFD) of member 32 is the critical value in determining the data transmission efficiency of the transducing core. The transducing efficiency of the core may in part be expressed by the relationship G/PFD. As the gap G is made smaller so must the PFD. The gap G determines the packing density. The smaller the gap the greater the packing density, i.e., the more flux reversals can be stored on the recording medium for a given length in direction 21 of the recording medium (tape 19). The smaller the PFD, the higher the signal-to-noise ratio for a given track width (the dimension into the drawing, FIG. 1—the thickness of the head). For example, a high signal-to-noise ratio for a 5 mil wide track would be 30 db. As known in this art, as the track width is halved, the signal decreases by about 6 db. Therefore it is difficult to get a good signal-to-noise ratio with a relatively narrow track width. The narrower the track width, the greater the number of tracks for a given width of recording tape medium, the higher the areal packing density. But there also are other factors. If the PFD of a material as brittle as Alfecon is made smaller than a minimal dimension with respect to the length e (which may be generally referred to as aspect ratio) the pole face member may fracture. Also the dimension e should be some minimum dimension to prevent flux leakage across recess 26 from element 12 at face 22. This minimum PFD is a limiting factor in the design, that is, for a given efficiency (signal-to-noise ratio for a given packing density), the minimum PFD determines the minimum value of G. By way of example, for a good head efficiency G should have a value of about 10–16 microinches and PFD a value of about 200–500 microinches and the length e may be about 2 mils. However, with such dimensions, the cantilevered element 32' formed with pole face 32 would tend to fracture easily unless otherwise provided for.

To prevent such fracturing in accordance with the illustrative embodiment, recess 26 is filled with copper or other non-magnetic high temperature material. This filler material serves as a structural support for the cantilevered element 32' and prevents fracturing thereof due to forces produced by the magnetic tape in direction 23 during use. It also provides a flux path barrier for the induced flux permitting filled recess 26 to act as a flux gap.

Figure 2:
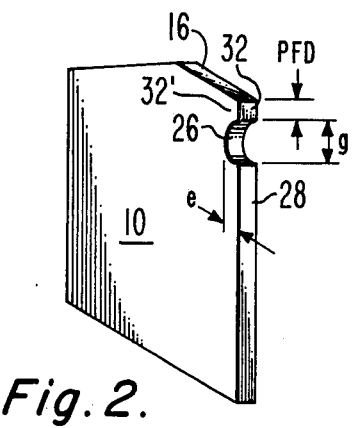
FIG. 2 is a perspective view of one of the elements of the core of FIG. 1.
Figure 6:
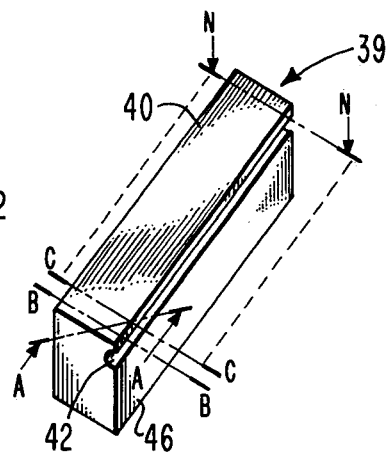
FIG. 6 shows a perspective view of a block of magnetic material used to make the element of FIG. 2.

Element 10 is constructed as follows. In FIG. 6 block 39 of Alfecon is formed into a rectangular bar and then ground and lapped to the desired size. The taper 17 on the head adjacent the transducer surface 16 (FIG. 1) may be formed by cutting the block along the lines A—A. A groove 42 forming recess 26 is then formed along the longitudinal direction of the block. The e and g dimensions may be greater at this stage than when in the final configuration, FIG. 2. This is to allow further machining of the bar as will be described.

Figure 4:
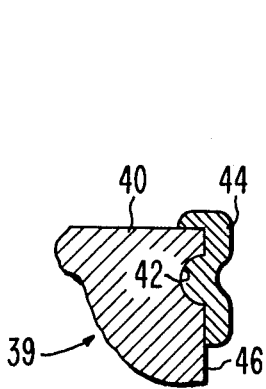
FIGS. 4 and 5 show end sectional views of the elements of FIG. 2 during various stages of processing.
Figure 5:
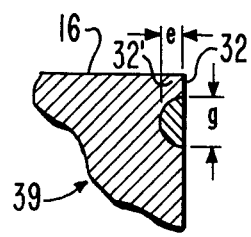

The groove 42 is then filled, FIG. 4, by any suitable deposition techniques with non-magnetic material such as by electroplating with copper in the case of a metal core. The block 39 may be appropriately masked so that the filler material is confined to areas adjacent groove 42. In FIG. 4, a layer of copper 44 completely fills the groove 42 and may overlap surfaces 40 and 46 of the block 39. By grinding, lapping and polishing, the copper filled groove 42 is formed to the desired dimensions e and g with no copper outside the groove 42. The braze material 33 is also deposited at this time.

The element 12 is formed in a similar manner except that instead of forming a groove 42 a groove having the dimensions of opening 20 is formed in this block. This groove (for opening 20) is not filled with any material. The facing surfaces 28 in element 10 and 30 in element 12 are ground and polished to the desired flatness. The aluminum oxide gap layer material 14 is then deposited on the facing surfaces 28 and 30. The areas 29 and 31 where the braze material 33 is deposited are masked to prevent coating with the aluminum oxide. Opening 20 may have its walls coated with the aluminum oxide. As shown opening 20 was masked from the aluminum oxide.

A groove (not shown) used to aid in bonding element 10 and 12 together may be formed in the facing surfaces 28 and 30 of the elements 10 and 12, respectively, at respective areas 29 and 31 while still in block form and filled with the brazing alloy. This alloy is melted until it flows into such grooves. No aluminum oxide material 14 is deposited on the exposed braze alloy surface or its groove. The two aluminum oxide coated surfaces 28 and 30 (including the pole face surfaces 32 and 22, respectively) are clamped together and the elements joined by firing in a high temperature oven at 1600° F. to melt and flow the alloy 33 at their interface to form the bond. This firing temperature does not affect material 14. The two blocks out of which elements 10 and 12 are formed (only block 39 for element 10 being shown) are a single structure at this point, which is then sliced along the lines B—B, C—C—N—N, FIG. 6, to form a plurality of magnetic heads, each head comprising two bonded elements 10 and 12.

The gap G is determined by the combined thickness of the aluminum oxide coatings deposited on the two elements 10 and 12. After bonding elements 10 and 12, the transducing surfaces 16 and 18 are again ground and lapped until the desired final pole face depth PFD is reached. This lapping operation is achieved, for example, by running a lapping tape over the transducing surfaces 16 and 18.

The resulting structure provides a very highly efficient transducing head core with a very rigid pole face structure that has good resistance to fracturing. It should be understood that the length dimension e for the recess 26 should be as small as possible to reduce the path length for the flux around the recess 26.

The positions of opening 20 and the recess 26 are important. The upper edge 50 of the opening 20 should be aligned approximately in the center of the g dimension of recess 26. This prevents flux leakage from upper edge 50 to surface 28 of element 10. For example, if the point 52 on element 10 were aligned with point 54 on element 12, then flux leakage could take place between those two points through the small gap G as occurs between aligned surfaces 22 and 32. This is undesirable. In the embodiment of FIG. 1 the flux path is clearly defined by the end face area of pole face 32 which is aligned with pole face 22 across gap G.

Figure 7:
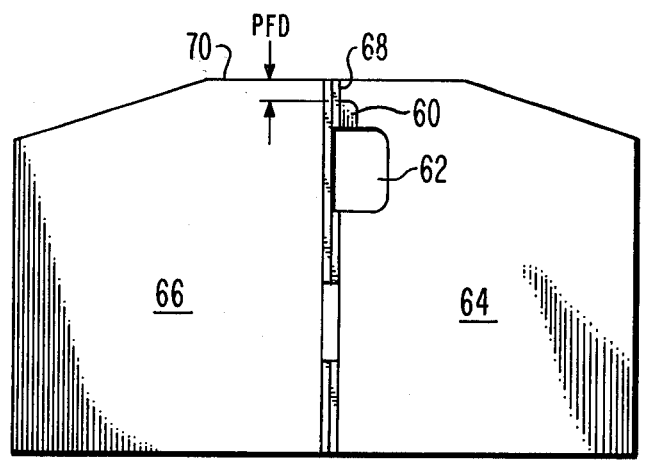
FIG. 7 is an end view of an alternate embodiment of a core in accordance with the present invention.

In FIG. 7 there is shown an alternate embodiment in which a recess 60 is formed adjacent opening 62 in element 64 formed from a block of material. Opening 62 corresponds to opening 20 of the previous figures and is for receiving a flux inducing winding. The facing element 66 has no groove or recess for providing a pole face member. Recess 60 is filled with copper or other non-magnetic metal as described above. Opening 62 is then formed. In this case, the pole face 68 of element 64 provides the flux path adjacent the transducing surface 70. The non-magnetic material is deposited by electroplating or other deposition technique and ground and lapped to size. The elements 64 and 66 are bonded together as described above and the transducing surface 70 ground and lapped to produce the desired pole face depth.

Figure 8:
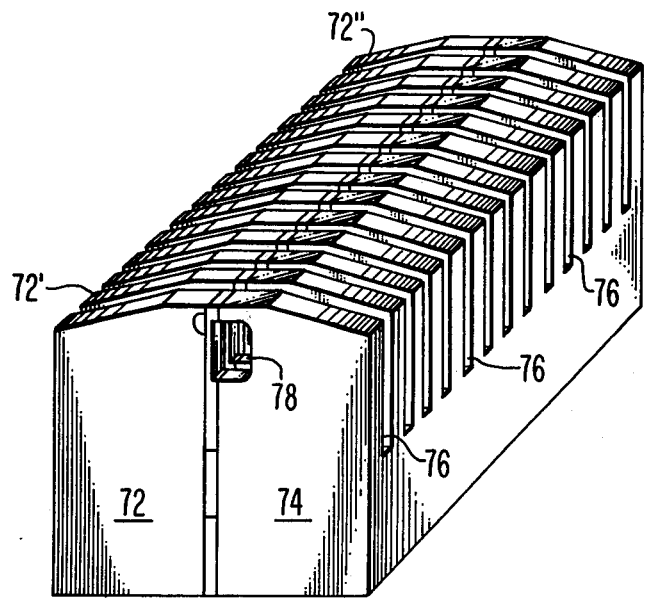
FIG. 8 is a perspective view of a multi-track head.

In FIG. 8 there is shown a multi-track head in which element 72 corresponds to element 10 of FIG. 1 and element 74 corresponds to element 12 of FIG. 1. In this case instead of slicing the blocks as shown in FIG. 6 completely through to form separate elements, the blocks are grooved as at 76 with multiple parallel spaced grooves to form spaced parallel transducing elements 72, 72' and 72" and so forth. Otherwise the elements 72 and 74 are produced in a manner similar to that described above for elements 10 and 12. A single common bus wire (not shown) is inserted through all of the openings 78. Individual separate flux inducing wires to be connected to appropriate sources of power are inserted in the slots 76 and joined to the single bus wire inserted in the openings 78 to form the completed flux inducing wires. Aluminum oxide provides the flux gap spacing material between the two elements 72 and 74 when made of Alfecon.

What is claimed is:

1. In a magnetic head, first and second magnetic elements, each formed with a straight first surface, said elements lying in a common plane with the straight surfaces parallel to and closely spaced from one another, the straight surfaces defining between them a flux gap, each element also being formed with a second surface at approximately right angles to its straight surface the second surfaces of the elements being aligned, said first element being formed with a first notch in its straight first surface close to the second surface thereof, a surface of the notch and a portion of the second surface of the first element defining between them a cantilevered pole piece having a face which faces the second element, a non-magnetic material filling said notch for supporting said pole piece, a non-magnetic coating having a melting point higher than that of a brazing alloy, said coating over each said straight surfaces including said non-magnetic material, an opening in said coating on each of said surfaces at facing first and second portions of said straight surfaces, and said brazing alloy joining said straight surfaces solely at said first and second portions.

2. In the magnetic head as set forth in claim 1, said first surface of said second planar member being formed with a second notch therein close to the surface of said second surface thereof, a surface of said second notch and said second surface together defining a second cantilevered pole piece having a pole face, the surface of the pole face defined by said second notch being aligned with the approximate center of the notch in the first member, said second notch for receiving a flux inducing winding.

3. In a magnetic head as set forth in claim 1, said first element being formed with a second notch in its straight first surface further from said second surface than said first notch for receiving a flux inducing winding, said first notch joining said second notch at said straight surface of said first element.

4. In the magnetic head of claims 1, 2 or 3, said elements being made of brittle material, said cantilevered pole piece having a pole face depth so small that the pole piece if unsupported would tend to fracture when a force is applied to the second surface of the first magnetic element at the cantilevered pole piece, said non-magnetic material strengthening said pole piece to counteract this tendency.

5. In the magnetic head of claim 4, said head being made of an aluminum-silicon-iron alloy and said non-magnetic material being copper.

6. In the magnetic head of claim 1, said elements each having non-magnetic material on their straight first surfaces for spacing said elements from one another.

7. A magnetic transducer core comprising:
first and second magnetic elements secured in spaced relation, one surface of each element forming a transducing surface,
a non-magnetic medium sandwiched between said elements along facing surfaces lying in planes intersecting said transducing surface and forming a flux gap between said elements, said medium having a bonding space therein, and said medium having a relatively high melting point,
a brazing alloy having a melting point lower than that of said non-magnetic medium, located in said bonding space and bonding said elements to each other solely at said bonding space,
a first opening formed in the facing surface of one of said elements a first distance from said transducer surface for receiving a flux inducing winding, and
a non-magnetic material in and along a facing surface of one of said elements spaced from said transducer surface a second distance at least as great as said first distance at its furthest point from said transducing surface and a third distance less than said first distance at its closest point to said transducing surface.

8. The core of claim 7 wherein said magnetic elements and non-magnetic material are metals.

9. The core of claim 7 wherein said transducing surface is normal to said facing surfaces.

10. A magnetic transducer core comprising:
first and second magnetic elements secured in spaced relation, one surface of each element forming a transducing surface,
a non-magnetic spacing medium between said elements along facing surfaces of the elements terminating at said transducing surface and forming a flux gap between said elements, said spacing medium having a bonding gap on each said facing surfaces at facing locations thereon, said spacing material having a melting point higher than that of the brazing alloy set forth below,
a brazing alloy joined directly to said elements solely at said facing locations,
a first opening formed in one of said elements for receiving a flux inducing winding, said first opening being formed in and along that one element's facing surface between first and second distances from said transducing surface and forming a first flux gap face having a first flux gap depth determined by the lesser of said distances, and
a non-magnetic material in and along the facing surface of the other element a third and fourth distance from said transducing surface respectively less than and greater than said lesser distance for forming a second flux gap face having a second flux gap depth determined by said third distance, the edge of said opening at said lesser distance forming said first flux gap depth being in alignment with and facing said non-magnetic material.

11. The core of claim 10 wherein said elements are made of ferrite and said non-magnetic material is made of a non-magnetic refractory material.

* * * * *